United States Patent

Merrell et al.

[15] 3,691,297

[45] Sept. 12, 1972

[54] SYNCHRONIZATION PHASE-LOCK SYSTEM FOR A DIGITAL VERTICAL SYNCHRONIZATION SYSTEM

[72] Inventors: Richard G. Merrell, Darien; Melvin C. Hendrickson, Elmhurst, both of Ill.

[73] Assignee: Zenith Radio Corporation, Chicago, Ill.

[22] Filed: May 6, 1971

[21] Appl. No.: 140,852

[52] U.S. Cl. ................178/69.5 TV, 328/63, 331/20
[51] Int. Cl. ..............................................H04n 5/04
[58] Field of Search................178/7.3 S, 7.3 R, 7.5 R 69.5 TV, 178/69.5 R; 331/18, 20; 340/168; 307/269, 208; 328/63, 72, 139

[56] References Cited

UNITED STATES PATENTS

| | | | |
|---|---|---|---|
| 2,980,858 | 4/1961 | Grondin et al. | 178/69.5 R |
| 3,530,238 | 9/1970 | Matarese | 178/7.3 S |

*Primary Examiner*—Robert L. Richardson
*Attorney*—John J. Pederson and Donald B. Southard

[57] ABSTRACT

A synchronization phase-lock system in a television receiver for maintaining coincidence between locally-generated vertical synchronization pulses and vertical synchronization pulses developed from received television transmissions. The phase-lock system utilizes the received vertical sync pulses in conjunction with gating circuitry to condition an up/down binary counter to count, within predetermined limits, in a first, or "up", direction during the received vertical sync interval and in the opposite, or "down" direction during the vertical trace interval of the received signal. Locally generated vertical sync pulses are also applied to the up/down binary counter wherein each pulse initiates one count. A locally generated vertical sync pulse occurring during the received vertical sync pulse interval generates one "up" count representative of coincidence between the received and locally generated vertical sync pulses. If the locally generated vertical sync pulse occurs during the vertical trace interval, a "down" count indicating non-coincidence is initiated. The phase-lock system further includes a reset gating circuit activated by the up/down binary counter reaching its "down" counting limit for resetting the phase of the locally generated vertical sync pulses such that they will be coincident with the received vertical sync pulses.

10 Claims, 6 Drawing Figures

Inventors
Richard G. Merrell
Melvin C. Hendrickson
By [signature]
Attorney

Inventors
Richard G. Merrell
Melvin C. Hendrickson
By
Attorney

FIG. 3
(Expanded Time Base)
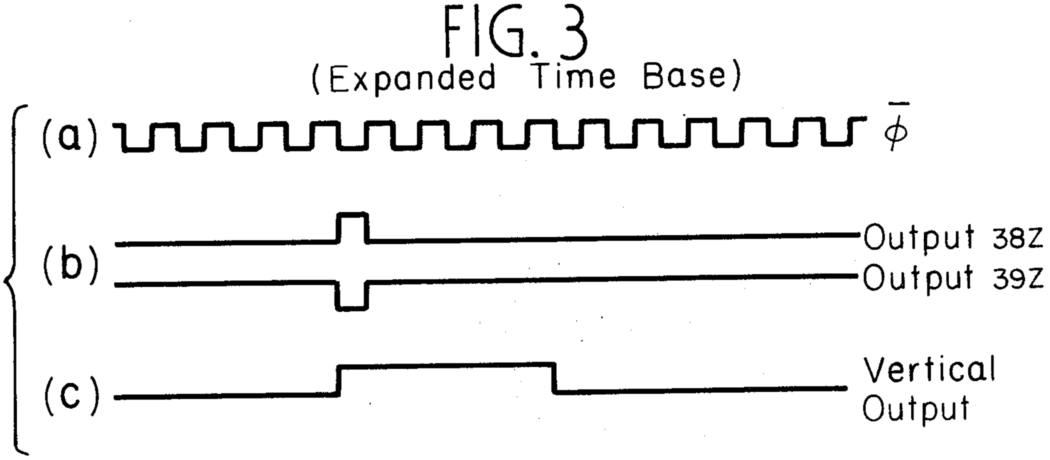
FIG. 5
| Confidence Level \ Output | 80 Z | 80 Y | 80 X |
|---|---|---|---|
| 0 | L | L | L |
| 1 | L | L | H |
| 2 | L | H | L |
| 3 | L | H | H |
| 4 | H | L | L |
| 5 | H | L | H |
| 6 | H | H | L |
| 7 | H | H | H |
FIG. 6
(Expanded Time Base)
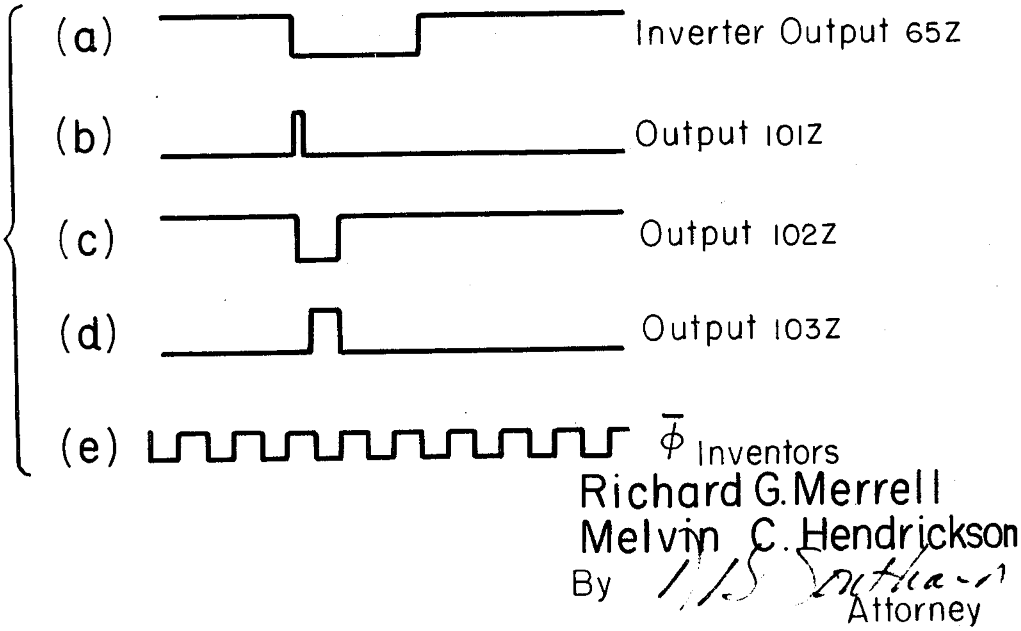
Inventors
Richard G. Merrell
Melvin C. Hendrickson
By [signature]
Attorney Inventors
Richard G. Merrell
Melvin C. Hendrickson
By [signature]
Attorney

SYNCHRONIZATION PHASE-LOCK SYSTEM FOR A DIGITAL VERTICAL SYNCHRONIZATION SYSTEM

BACKGROUND OF THE INVENTION

The present invention relates generally to improvements in television receivers and more particularly to synchronization phase-lock systems for insuring that an in-phase relationship is maintained between the locally generated vertical synchronization pulses and those extracted from the received television signal.

Prior to the development of digital vertical synchronization systems, television receivers, for the most part, utilized integrated vertical sync pulses to trigger the receiver's vertical sweep system. Typically, this is accomplished by removing, or clipping, a portion of the vertical sync signal from the received composite video signal, applying the clipped portion to a vertical oscillator, and integrating the resultant output. Such a system, however, is sensitive to ignition noise, airplane flutter, co-channel and adjacent channel interference, all of which may cause the system to react to "false" vertical sync pulses. The resultant integrated vertical sync pulse may, as a result, have a shape, phase and amplitude differing from those signals resulting from the received vertical sync pulses. These variations result in the initiation of vertical sweep before the previous vertical sweep has been completed thereby impairing not only the interlace of alternate fields during each frame but also the proper superposition of successive frames resulting in loss of picture resolution.

To eliminate this problem, digital vertical synchronization circuits were devised. In most digital systems, a locally generated vertical sync pulse is applied to the vertical sweep generator. Since the locally generated pulse is not derived from the received vertical sync pulse, its relatively constant shape, phase and amplitude is ideally suited to trigger the sweep generator. Of course, the locally generated vertical sync pulse must be maintained in a proper phase relationship with the transmitted signal. Accordingly, some type of phase-lock system must be included to maintain coincidence between the locally generated and received vertical sync pulses when the viewer switches channels or the television broadcast station switches from one sync source to another. Such a system immunizes the receiver from misadjustment of the vertical frequency controls. Consequently, a television receiver utilizing a digital vertical system need not have provision for an external vertical hold control as was previously required.

Heretofore, phase-lock systems have generally utilized somewhat complex signal encoders and comparators to prevent "false" sync signals or ignition-type noise from disrupting the proper phase relationship between the locally generated and received vertical sync pulses. The development, however, of unique signal processing circuits which are relatively noise-free, such as that described and claimed in the copending application of Judson A. Hofmann, Ser. No. 873,757, filed Nov. 5, 1969, and now U.S. Pat. No. 3,624,288, and assigned to the present assignee, has permitted the development of a much simplified phase-lock system utilizing only a single gating means and an up/down binary counter. Accordingly, the development of advanced integrated circuit fabrication techniques has permitted the packaging of virtually the entire vertical synchronization system in compact, inexpensive units for inclusion in television receivers.

SUMMARY OF THE INVENTION

Accordingly, it is an object of the present invention to provide new and improved circuitry for automatically maintaining coincidence between locally generated vertical synchronization pulses and received vertical synchronization pulses.

A more particular object of the invention is to provide an improved synchronization phase-lock system which automatically resets the locally generated vertical synchronization pulses to a proper phase relationship with respect to the received vertical synchronization pulses upon reaching a minimum confidence counting level.

It is also an object of the invention to provide an improved synchronization phase-lock system which eliminates the need for a vertical hold control.

Another object of the invention is to provide an improved synchronization phase-lock system of the foregoing type which requires fewer components for insuring the proper phase relationship between the locally generated and received vertical sync pulses than prior art systems.

A further object of the invention is to provide an improved synchronization phase-lock system which is suitable for fabrication as an integrated circuit package.

In accordance with the present invention, a synchronization phase-lock system is provided for maintaining coincidence between locally generated vertical synchronization pulses and vertical synchronization pulses developed from received television transmissions. The synchronization phase-lock system of the present invention contemplates gating circuitry for conditioning an up/down binary counter to count within predetermined limits in a first predetermined ("up") direction during the received vertical sync pulse interval and in the opposite ("down") direction during the received vertical trace interval. A locally generated vertical sync pulse applied to the up/down binary counter during the received vertical sync pulse interval generates one "up" count which is representative of coincidence between the received and locally generated vertical sync pulses. Similarly, a locally generated vertical sync pulse occurring during the vertical trace interval initiates a "down" count indicating non-coincidence. The synchronization phase-lock system further includes a reset gating circuit which is activated by the up/down binary counter reaching its "down" counting limit for resetting the phase of the locally generated vertical sync pulses such that they will be coincident with the received vertical sync pulses.

BRIEF DESCRIPTION OF THE DRAWINGS

The features of this invention which are believed to be novel are set forth with particularity in the appended claims. The invention together with its further objects and advantages thereof, may best be understood, however, by reference to the following description taken in conjunction with the accompanying drawings, in which like reference numerals refer to like elements in the several figures and in which:

FIG. 3 is illustrative of selected waveforms associated with the 525 counter utilized in the preferred embodiment;

FIG. 5 is a table useful in understanding levels associated with outputs of the up/down binary counter; and FIG. 6 illustrates waveforms associated with the minimum confidence gate of the preferred embodiment.

PREFERRED EMBODIMENT OF THE INVENTION

Figure 1:
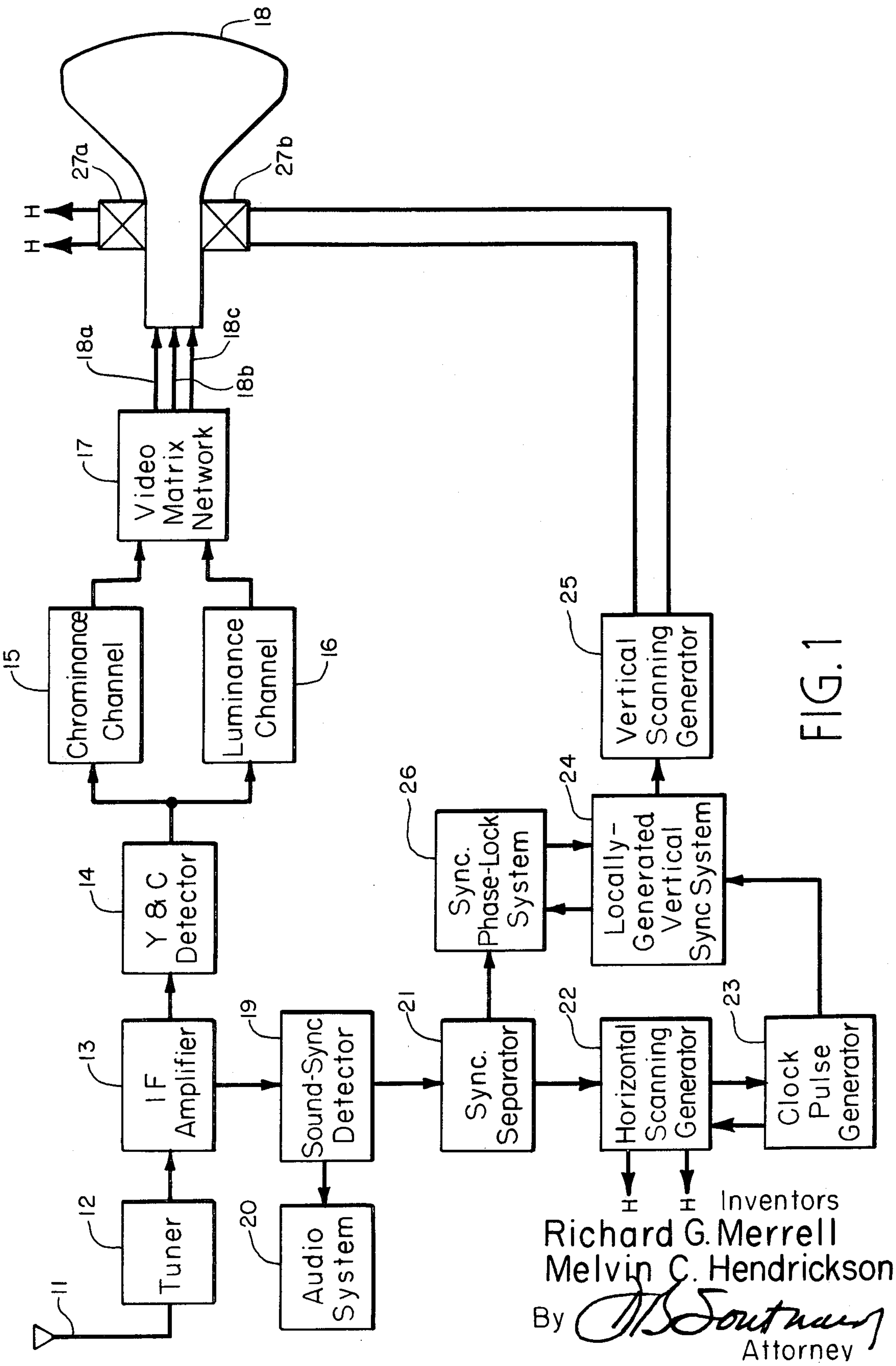
FIG. 1 is a block diagram of a television receiver which includes a synchronization phase-lock system in accordance with a preferred embodiment of the invention.

Referring now to FIG. 1, a color television receiver 10 is shown which incorporates a synchronization phase-lock system in accordance with the present invention. The receiver 10 includes an antenna 11 coupled to an input tuner stage 12 which amplifies the received signal and converts the same to an intermediate-frequency in the well-known manner. The amplified and converted signal is coupled to intermediate-frequency amplifier 13 where it is further amplified and then coupled to luminance (Y) and chrominance (C) detector 14, and also to a sound and sync detector 19. The Y and C detector 14 is connected to a chrominance channel 15 for developing the chrominance signals, which are applied to the video matrix network 17 as one of the informational inputs thereto. Detector 14 is likewise connected to the luminance channel 16 wherein the luminance signals are processed prior to application to the video matrix network 17, forming the other of its informational inputs. Appropriate matrixing occurs within matrix network 17 such that signals containing the correct brightness, hue and color saturation information are derived and applied to the appropriate control electrodes of the image reproducer 18 in a manner understood in the art. The image reproducer 18 may be a conventional shadow mask cathode-ray tube comprising a tri-color image screen or target (not shown) to be selectively scanned by a group of three electron beams developed by individual guns within the tube. In the embodiment of the receiver as herein shown, the color signals R, G and B are applied directly to the cathodes 18*a*, 18*b* and 18*c*, respectively. It should be understood, however, that other systems are equally compatible, such as those receivers designed to utilize color-difference signals. The type of chroma processing is not directly related to the subject matter of the present invention and is in no way critical to its operation.

Sound & sync detector 19, in turn, connects to an audio system 20 having appropriate circuitry for reproducing the audio portion of the received signal. Sound and sync detector 19 further connects to a sync separator 21 wherein the sync portion of the received signal is stripped from the composite video signal. The horizontal synchronication pulses developed by the sync separator 21, in turn, are coupled to horizontal scanning generator 22 wherein appropriate horizontal scanning signals are developed for application to the appropriate deflection yoke 27*a* positioned about the image reproducer 18. The horizontal scanning generator 22 is further coupled to a clock pulse generator 23 wherein a clock pulse train occurring at a 31.5 kHz rate is generated. In turn, a locally generated vertical synchronization system 24 is coupled to the output of clock pulse generator 23 thereby developing locally generated vertical synchronization pulses from the clock pulse train. The locally generated vertical synchronization pulses are then coupled to a vertical scanning generator 25 wherein appropriate scanning signals are developed for application to the appropriate deflection yoke 27*b* positioned about the image reproducer 18.

A synchronization phase-lock system 26 is further coupled to sync separator 21 and receives vertical synchronization pulses therefrom. A second input from the locally generated vertical synchronization system 24 is also coupled to synchronization phase-lock system 26 wherein coincidence or non-coincidence of the locally generated synchronization pulses and the received vertical synchronization pulses is determined. Upon finding a non-coincidence condition, the synchronization phase-lock system 26 will generate a correction signal and apply it to the locally generated vertical synchronization system 24 such that its phase is corrected to attain coincidence with the received vertical synchronization pulses.

As thus far described, the receiver is conventional in general construction and operation such that further and more particular operational description should not be necessary. More particular consideration, however, may now be given to that portion of the receiver 10 which relates to the preferred embodiment of the present invention, and in general constitutes synchronization phase-lock circuitry in conjunction with a locally generated vertical synchronization system, identified generally at 26 and 24, respectively.

Figure 2:
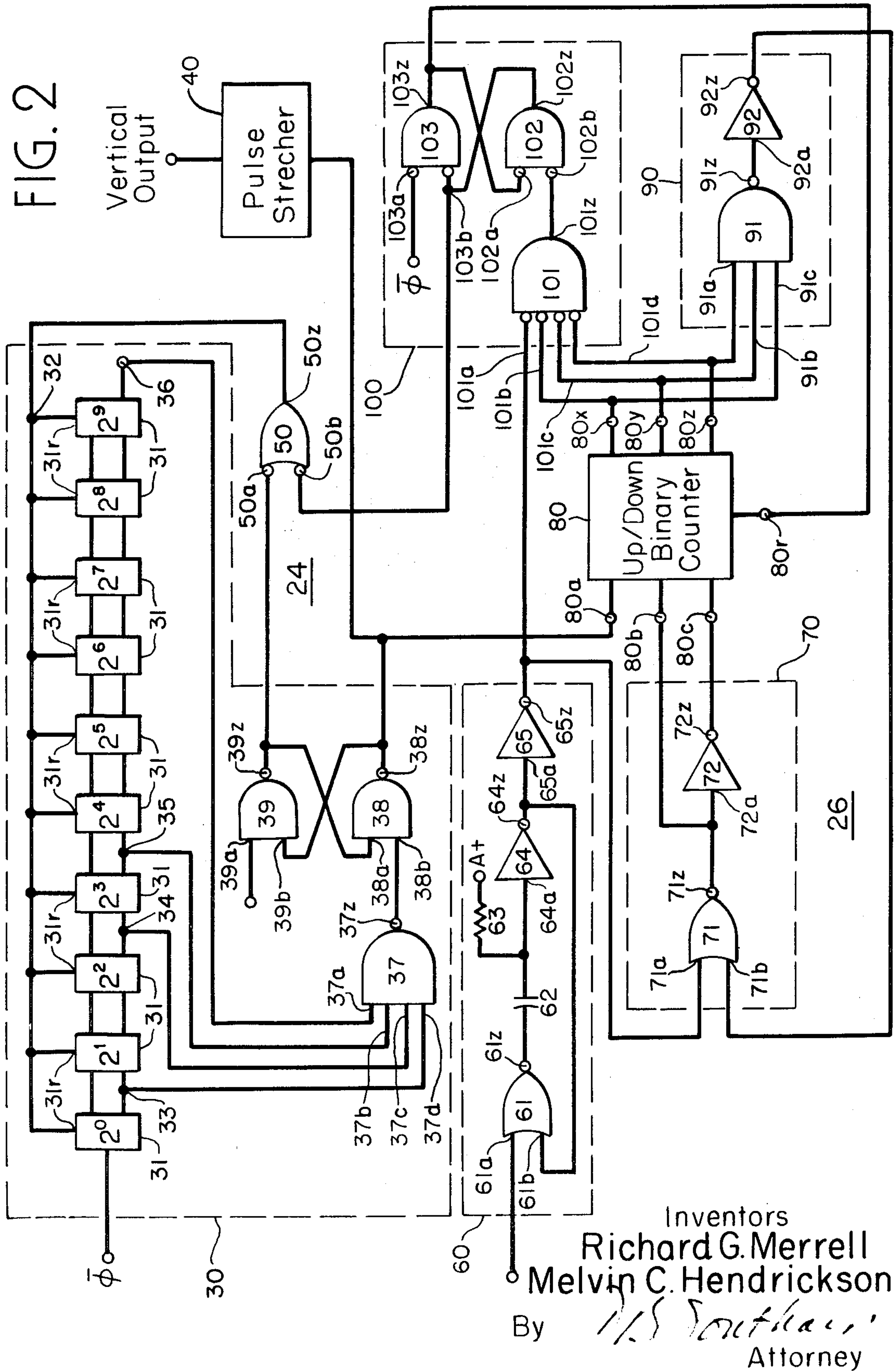
FIG. 2 is a combined schematic and block diagram of a digital vertical synchronization system including a synchronization phase-lock arrangement.

In operation, and as best seen in FIG. 2, negative ($\bar{\phi}$) clock pulses occurring at a 31.5 kHz rate are coupled from the clock pulse generator 23 (FIG. 1) to the input of a 525 counter 30 comprised of 10 serially-connected binary flip-flops 31. Each flip-flop 31 has positive and negative outputs coupled to the corresponding inputs of the successive flip-flop 31 while the reset terminal 31r of each flip-flop 31 is connected to a common junction 32 such that each individual flip-flop 31 may be reset to its low (L), or "0" state by a high (H) level pulse applied thereto. Consequently, each successive flip-flop $\overline{31}$, beginning with that one initially receiving the $\bar{\phi}$ clock pulses, represents an increasing power of two (i.e., $2^0$, $2^1$, . . . , $2^9$). Therefore, each negative ($\bar{\phi}$) clock pulse beginning with the first changes the state of appropriate flip-flop 31 such that the equivalent binary code of the decimal number of pulses counted is formed. If the 31.5 kHz $\bar{\phi}$ clock pulses are to provide a 60 hz output pulse train for use as a locally generated vertical sync pulse, it is necessary to divide the 31.5 kHz $\bar{\phi}$ input pulses by 525. This is accomplished by counting 524 $\bar{\phi}$ clock pulses and then generating an output pulse suitable for use as a vertical sync pulse on the 525th $\bar{\phi}$ clock pulse. Accordingly, the flip-flops 31 representing $2^0$, $2^2$, $2^3$, and $2^9$ will be in their high (H), or "1", state upon counting the 525th $\overline{\phi}$ clock pulse, while the other flip-flops 31 will be in their low (L), or "0", state thereby generating the binary code (1000001101) which is unique to the 525th decimal count. For each count up to and including 524, the $2^0$, $2^2$, $2^3$ and $2^9$ flip-flops 31 will not all be H (1) at the same time. The negative outputs 33, 34, 35, 36 of the $2^0$, $2^2$, $2^3$, $2^9$ flip-flops 31, respectively, are coupled to the input terminals 37*a*, 37*b*, 37*c*, 37*d* of NAND 37. Accordingly, when all of the inputs to NAND 37 are high (H), the output 37*z* will be switched to a low (L) level. Output 37*z*, in turn, is coupled to the input 38b of NAND 38 which is interconnected with NAND 39 to form an RS flip-flop. Further, the output 38*z* of NAND 38 is also coupled to an input 39*b* of NAND 39 while its output 39*z* is coupled to an input 38*a* of NAND 38. Positive ($\phi$) clock pulses are applied to the input 39*a*. Prior to the 525th $\overline{\phi}$ clock pulse, NAND 38 and NAND 39 are in their respective quiescent states; that is, the output 38*z* is low (L), and the output 39*z* is high (H). Upon coincidence of the leading edges of the pulse generated at output 37*z* by the 525th $\overline{\phi}$ clock pulse and the $\phi$ clock pulse, the outputs 38*z* and 39*z* change their respective states to high (H) and low (L) (best seen in FIG. 3(*b*)). Consequently, the trailing edge of the $\phi$ clock pulse at input 39*a* will reset NAND 38 and NAND 39 back to their original states, low (L) and high (H), respectively. Accordingly, as shown in FIG. 3(*b*), positive and negative output pulses occurring at a 60 hz rate are developed by each 525th $\overline{\phi}$ clock pulse. The positive output pulse is further coupled from output 38*z* to a pulse stretcher 40 (FIG. 2) where the pulse is stretched, as illustrated in FIG. 3(*c*), to a predetermined length thereby providing a locally generated vertical sync pulse which may then be applied to the vertical scanning generator 25. The negative output pulse from output 39*z* is, in turn, coupled to the input 50*a* of NOR reset gate 50. The NOR reset gate 50, in response to the negative pulse applied at input 50*a*, switches to a high (H) state at its output 50*z* which is coupled to the junction 32 of the flip-flop reset terminals 31r. This is effective to reset each flip-flop 31 to its low (L), or "0", state thereby initiating a new cycle in its counting process.

In accordance with one aspect of the present invention, a synchronization phase-lock system, a portion being identified generally at 26 in FIG. 2, is provided which is effective to maintain coincidence between locally generated vertical synchronization pulses and received vertical synchronization pulses transmitted by television broadcasting stations.

To this end, received vertical sync pulses are integrated and, in turn, coupled from the sync separator 21 (FIG. 1) to a monostable multivibrator 60. During the interval between integrated sync pulses (as indicated by the interval A in FIG. 4(*a*)), the input 61a to NOR 61 is at a low (L) level thereby maintaining the NOR output 61*z* at a high (H) level, provided that the other input 61*b* is low (L). Assuming that input 61*b* is in fact low (L), the high (H) level at output 61*z* is coupled to capacitor 62, the other end of which is coupled through a resistor 63 to a source of DC bias potential A+. The input 64*a* of inverter 64 is coupled to the junction of capacitor 62 and resistor 63 which is at a high (H) level thereby providing a low (L) level at inverter output 64*z*. A second inverter 65 having an input 65*a* coupled to output 64*z* provides an inverted signal at output 65*z*. The low (L) level at output 64 *z* is also coupled back to input 61*b* of NOR 61, assuring that the level at output 61*z* is high (H).

Figure 4:
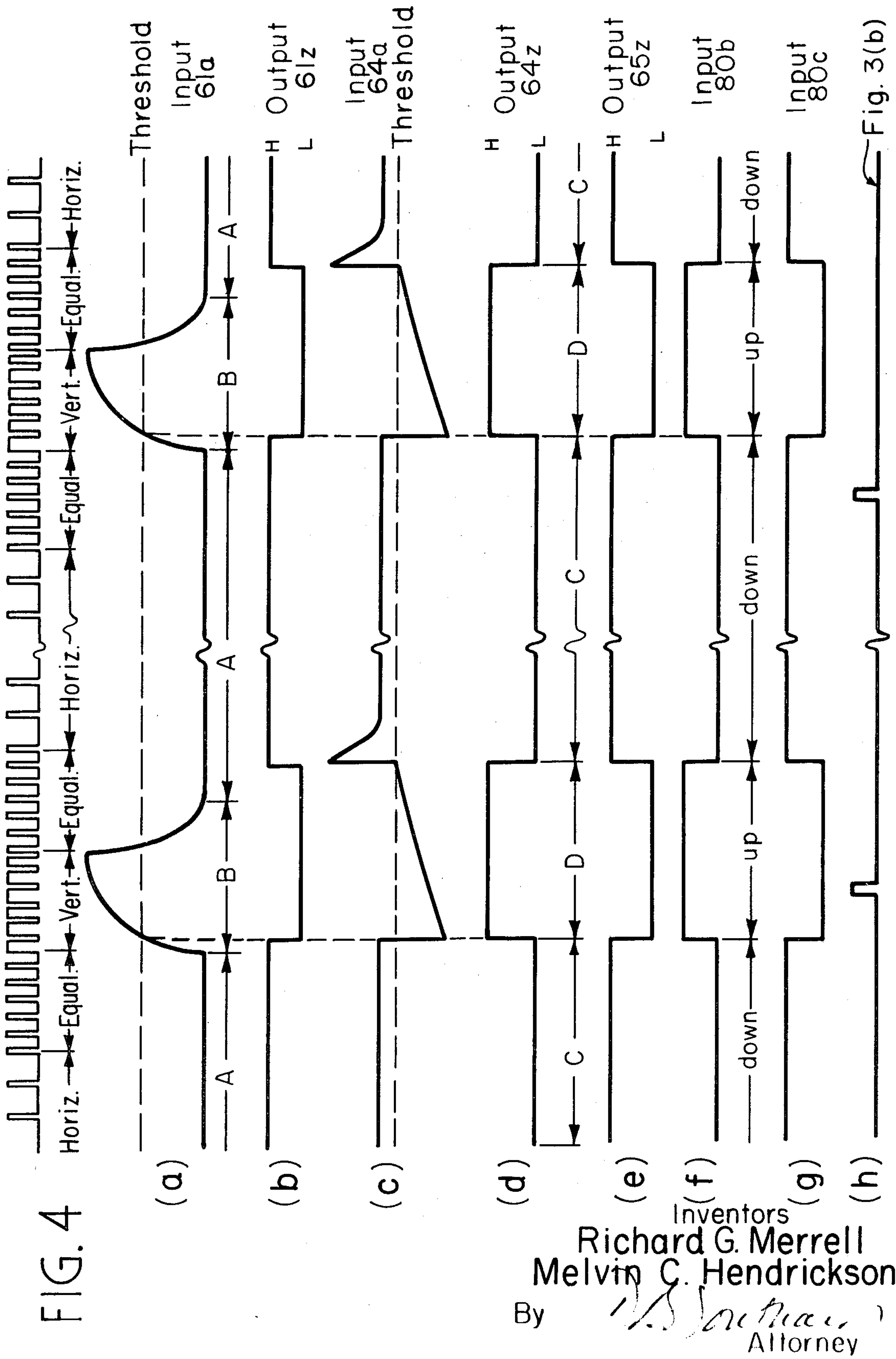
FIG. 4 shows certain waveforms associated with the multivibrator and the up/down gate utilized in the present invention.

Referring now to interval B of FIG. 4(*a*) wherein an integrated vertical sync pulse is depicted, the output 61*z* of NOR 61 will be considered to have remained at low (L) level until its input 61*a* reaches the threshold level where the signal is then considered to be high (H). This, as is illustrated in FIG. 4(*b*), switches the NOR output 61*z* to its low (L) state whereupon the change in signal level is immediately translated across capacitor 62 to inverter input 64*a* which is simultaneously switched to a low (L) level, as shown in FIG. 4(*c*). This, in turn, forces the output 642, and correspondingly the input 61*b*, to a high (H) level. When the trailing edge of the integrated sync pulse has dropped below the threshold level, input 61*a* will once again shift to a low (L) level. However, the low (L) level at inverter input 64*a*, due to the charge on capacitor 62, will prevent the inverter output 64*z* from switching to a low (L) level until capacitor 62 has recharged at a rate determined by the RC time constant. Once capacitor 62 has recharged to a level where the inverter input 64*a* is high (H), the inverter output 642 will force input 61*b* to a low (L) level resulting in a high (H) level output at output 61*z* of NOR 61. Accordingly, it will be seen from FIG. 4(*d*), representing the output 64*z* of inverter 64, that a positive pulse having low (L) level during the interval A, corresponding approximately to the vertical trace, and a high (H) level during interval B, corresponding roughly to the vertical sync period, will result. Upon inversion by inverter 65, the signal as illustrated in FIG. 4(*e*) will be provided at multivibrator output 65*z*.

As shown in FIG. 2, an up/down gate 70 is serially connected between the output 65*z* of monostable multivibrator 60 and the inputs 80*b*, 80*c* of an up/down binary counter 80. More specifically, up/down gate 70 is comprised of a NOR 71 having an input 71*a* coupled to monostable multivibrator output 65*z* and an output 71*z* connected to the input 72*a* of inverter 72. Inverter output 72*z* is coupled to input 80*c* of counter 80 while the counter input 80*b* is connected directly to output 71*z*. During the time interval C (FIG. 4(*e*)), the multivibrator output 65*z* will be at high (H) level, and the NOR output 71*z* coupled to counter input 80*b*, will be low (L) (FIG. 4(*f*)). The low (L) level at output 71*z* is also inverted at the inverter output 72*z* such that the signal at up/down counter input 80*c* is at a high (H) level as shown in FIG. 4(*g*). On the other hand, during interval D which is representative of the received sync pulse interval, the output 65*z* is at a low (L) level. If it is assumed that input 71*b* is low (L), the low (L) level at input 71*a* will switch the NOR output 71*z* to a high (H) level during interval D. As a result, the input 80*b* to up/down counter 80 will be high (H), and inversion by inverter 72 will provide a low (L) level at input 80*c*. Accordingly, the signals applied at inputs 80*b*, 80*c* and illustrated in FIGS. 4(*f*) and 4(*g*), respectively, are effective to condition the up/down binary counter 80 to count in a more-positive ("up") or less-positive ("-down") direction. It is apparent from the referenced illustrations that the up/down counter 80 will be conditioned to count "down" during the interval between integrated vertical sync pulses while it will be conditioned to count in the opposite, or "up", direction during the received vertical sync pulse interval.

Counting is initiated by coupling the positive output pulse at output 38z of counter 30, and representative of the locally generated vertical sync pulse, to input 80a of up/down counter 80. Each positive output pulse applied at input 80a will cause counter 80 to count one decimal integer in either the "up" or "down" direction. If the up/down gate 70 is conditioned to count "down", the positive output pulse at counter input 80a will cause the counter 80 to count "down", thereby indicating that an out-of-phase condition exists between the locally generated vertical sync pulse and the received vertical sync pulse. If, however, the positive output pulse occurs during the interval when up/down gate 70 has conditioned counter 80 to count "up" (indicative of coincidence between the locally generated vertical sync pulse and the received vertical sync pulse from the sync separator 21), counter 80 will count "up" by one integer. Accordingly, up/down counter 80 will eventually count "up" to its maximum binary capacity (7), "down" to its minimum (0) capacity, or between the maximum and minimum depending on the coincidence or lack thereof between the locally generated vertical sync pulses and the received vertical sync pulses.

Assuming for the present that the up/down counter 80 counts to its maximum, indicating absolute confidence that the locally generated vertical sync pulses and the received vertical sync pulses are in phase, there will be no reason to reset the locally generated vertical sync system 24. Therefore, provision is made for a maximum confidence gate 90 (FIG. 2). Gate 90 is selectively coupled to the up/down counter outputs 80x, 80y, 80z which outputs, as shown in FIG. 5, provide a binary output equivalent to the count reached at any time. These outputs are coupled to the inputs 91a, 91b, 91c of NAND 91 having an output 91z serially connected to the input 92a of an inverter 92, while the inverter output 92z, in turn, is coupled back to the input 71b of NOR 71. Accordingly, when the up/down counter 80 reaches its maximum count (7), all three of its outputs 80x, 80y, 80z will be at a high (H) level. As a result, NAND 91 provides a low (L) output to the inverter input 92 which, in turn, provides a high (H) output to NOR input 71b. The high (H) input to input 71b will override the signal level applied to input 71a and force the up/down gate 70 to condition up/down counter 80 to count "down" upon receipt of the next positive output pulse at input 80a even though the locally generated vertical sync pulse and the received vertical sync pulse may be in phase. Upon receipt of the next positive output pulse, the up/down counter 80 will, in fact, count "down" to a level (6) one integer below maximum. With the up/down counter 80 registering a less than maximum count (6), the outputs 80x, 80y, 80z will not all be in a high (H) state. Thus, maximum confidence gate 90 will remove the high (H) level override at input 71b, and once again the input 71a will become dominant as was initially assumed. If the next positive output pulse at input 80a occurs while the locally generated vertical sync pulse is in-phase with the received sync pulse, the up/down counter 80 will again count "up" to its maximum (7). Accordingly, as long as the locally generated vertical sync pulses and the received vertical sync pulses remain in coincidence, up/down counter 80 will "oscillate" between the 6 and 7 count. If, on the other hand, they are not in phase, up/down counter 80 will continue to count "down" until coincidence between the two signals is attained or it reaches its minimum (0).

If it is assumed that the up/down counter 80 counts "down" to its minimum (0), it becomes necessary to reset the locally generated vertical sync system 24 such that its locally generated vertical sync pulses are in phase with the received vertical sync pulses. To this end, the up/down counter outputs 80x, 80y, 80z are further coupled to the inputs 101b, 101c, 101d of NAND 101 which comprises, in part, minimum confidence gate 100. A fourth input 101a is connected to the output 65z of monostable multivibrator 60. Accordingly, when up/down counter 80 reaches its minimum count (0), outputs 80x, 80y, 80z will all be at a low (L) level. When applied to inputs 101b, 101c, 101d, NAND 101 will be maintained in a state of readiness to switch from a low (L) level to a high (H) level at its output 101z upon receipt of an additional low (L) level signal at input 101a. As previously described, an integrated vertical sync pulse applied to the monostable multivibrator input 61a generates a low (L) level pulse of a predetermined length at the output 65z (FIG. 6(a)). Therefore, upon receipt of the next received vertical sync pulse from the sync separator 21 immediately after the up/down counter 80 has counted to its minimum level, all four inputs 101a, 101b, 101c, 101d will be low (L). Accordingly, the NAND output 101z will provide the high (H) level pulse shown in FIG. 6(b) to the input 102b of NAND 102 which, together with NAND 103, comprises an RS flip-flop for stretching the pulse applied at input 102b. The output 102z of NAND 102 is coupled to the input 103b of NAND 103, and NAND output 103z is connected to the NAND input 102a. NAND input 103a, in turn, is coupled to the $\overline{\phi}$ clock pulse train. When up/down counter 80 has not counted to its minimum (0) level, NAND output 102z will be at a high (H) level and NAND output 103z will be at a low (L) level as illustrated in FIGS. 6(c) and 6(d), respectively. But upon receiving four low (L) level signals at inputs 101a, 101b, 101c, 101d, outputs 102z, 103z will switch states to a low (L) and high (H) level, respectively. Outputs 102z, 103z will remain in this state until the trailing edge of the next $\overline{\phi}$ clock pulse (FIG. 6(e)) resets the RS flip-flop to its original state. The stretched pulse developed at output 103z when applied to reset terminal 80r resets up/down counter 80 to a midway (4) level prior to the next count. This, in turn, means that inputs 101b, 101 c, 101d are no longer all low (L); therefore, output 101z again goes low (L).

The negative pulse generated at output 102z is, in turn, coupled to input 50b of NOR reset gate 50. Accordingly, the negative pulse will switch the output 50z to a high (H) level thereby providing a reset signal to the reset terminals 31r of counter 30. As a result, counter 30 is ready to begin a new counting cycle at some finite time after the trailing edge of the reset pulse has been applied to reset terminals 31r. Since counter 30 initiates a new counting cycle immediately following receipt of a vertical sync pulse by the sync separator 21, the next locally generated vertical sync pulse will coincide with the following integrated vertical sync pulse and counting will proceed in the "up" direction until the maximum count is attained or synchronization is again lost.

It is apparent, therefore, that the synchronization phase-lock system of the present invention will maintain the locally generated and received vertical sync pulses in a proper phase relationship. If the two signals should in fact reach a point (minimum confidence level) where they become unsynchronized, the phase-lock system will react by re-keying the locally generated vertical sync pulses to be coincident with the received vertical sync pulse thereby restoring synchronization. As a result, a vertical hold control is unnecessary. Furthermore, since the phase-lock system utilizes digital logic circuitry exclusively, the complete vertical synchronization system may be incorporated in integrated circuit packages.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. In a digital vertical synchronization system having a source of locally generated vertical sync pulses coupled to a vertical sweep system and a further source of derived vertical sync pulses developed from a received television signal, a synchronization phase-lock system, comprising in combination:

circuit means coupled to said source of derived vertical sync pulses for developing a control signal having a first signal level during the sync intervals of said derived vertical sync pulses and a second signal level during the trace intervals;

counter means coupled to said circuit means and to said source of locally generated vertical sync pulses, said first signal level of said applied control signal conditioning said counter means to count "up" to a maximum confidence level when the locally generated vertical sync pulses are in time coincidence with the derived sync pulses and said second signal level of said applied control signal conditioning said counter means to count "down" to a minimum confidence level upon non-coincidence, each of said locally generated vertical sync pulses initiating one count by said counter means; and gating means coupled between said counter means and said source of locally generated vertical sync pulses for correcting the phase of said locally generated vertical sync pulses so as to be coincident with said derived vertical sync pulses whenever said counter means reaches a condition of minimum confidence level.

2. A synchronization phase-lock system in accordance with claim 1 wherein maximum confidence gating means is coupled from said counter means to said circuit means, said maximum confidence gating means developing an override signal upon said counter means reaching its maximum counting level to force said circuit means to condition said counter means to count "down" upon receipt of the next locally generated vertical sync pulse.

3. A synchronization phase-lock system in accordance with claim 1 wherein said circuit means includes a monostable multivibrator and an up/down gate serially connected between the source of derived vertical sync pulses and said counter means, said monostable multivibrator developing output pulses during the sync intervals of the derived vertical sync pulses and applying said output pulses to said up/down gate for conditioning said counter means to count "up" only during said sync intervals.

4. A synchronization phase-lock system in accordance with claim 3 wherein said up/down gate includes a NOR gate and an inverter interconnected between said monostable multivibrator and said counter means, said NOR gate being activated by negative output pulses from said monostable multivibrator to apply a high level "up" control signal directly to one input of said counter means and through said inverter to a second input of said counter means, said control signal being effective to condition said counter means to count "up" during said sync intervals.

5. A synchronization phase-lock system in accordance with claim 4 wherein said maximum confidence gating means includes a NAND gate and an inverter serially connected between the outputs of said counting means and the input of said up/down gate, said maximum confidence gating means reacting to high level outputs of said counter means corresponding to its maximum counting level for generating a high level override signal at the input of said NOR gate, said high level override signal forcing said up/down gate to condition said counter means to count "down" upon receipt of the next locally generated vertical sync pulse regardless of its phase relationship with the corresponding derived vertical sync pulse.

6. A synchronization phase-lock system in accordance with claim 3 wherein said gating means includes a minimum confidence gate having respective inputs coupled to the outputs of said counter means and the output of said monostable multivibrator and further includes a reset gate interconnected between the output of said minimum confidence gate and the source of locally generated vertical sync pulses, said counter means upon reaching its minimum counting level being effective to condition said minimum confidence gate to generate a reset signal coincident with the next output pulse from said monostable multivibrator, said reset signal upon application to said reset gate generating a pulse for resetting the phase of the locally generated vertical sync pulses to be coincident with the derived vertical sync pulses.

7. A synchronization phase-lock system in accordance with claim 6 wherein said minimum confidence gate includes a NAND gate connected to an RS flip-flop, said RS flip-flop stretching said reset signal to a predetermined length for assuring that all logic is appropriately reset by said reset signal.

8. A synchronization phase-lock system in accordance with claim 7 wherein means connecting the output of said RS flip-flop to the reset terminal of said counter means is included for resetting said counter means to an arbitrary counting level whenever the minimum counting level is reached.

9. A synchronization phase-lock system in accordance with claim 6 wherein said reset gate includes a NOR gate.

10. A synchronization phase-lock system in accordance with claim 1 wherein the digital vertical synchronization system including said synchronization phase-lock system is fabricated in integrated circuit form.

* * * * *